No. 645,326. Patented Mar. 13, 1900.
S. W. NELSON.
PLANTING ATTACHMENT FOR CULTIVATORS.
(Application filed June 10, 1899.)
(No Model.)

WITNESSES:

INVENTOR
S. W. Nelson
BY
ATTORNEYS

THE NORRIS PETERS CO., PHOTO-LITHO., WASHINGTON, D. C.

UNITED STATES PATENT OFFICE.

SAMUEL W. NELSON, OF MUNDAY, TEXAS.

PLANTING ATTACHMENT FOR CULTIVATORS.

SPECIFICATION forming part of Letters Patent No. 645,326, dated March 13, 1900.

Application filed June 10, 1899. Serial No. 720,060. (No model.)

*To all whom it may concern:*

Be it known that I, SAMUEL W. NELSON, of Munday, in the county of Knox and State of Texas, have invented a new and Improved Planting Attachment for Cultivators, of which the following is a full, clear, and exact description.

One object of my invention is to provide a simple form of planting mechanism adapted for ready attachment to any cultivator and for operation by a ground-wheel of the cultivator.

A further object of the invention is to so construct the operating devices for the said planting mechanism that the seed may be dropped at any desired intervals apart.

The invention consists in the novel construction and combination of the several parts, as will be hereinafter fully set forth, and pointed out in the claim.

Reference is to be had to the accompanying drawings, forming a part of this specification, in which similar characters of reference indicate corresponding parts in all the figures.

Figure 1:
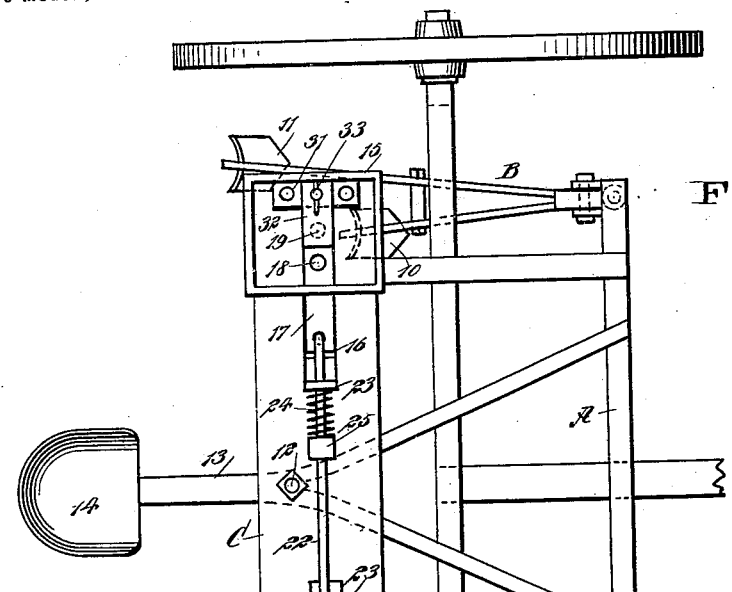
Figure 3:
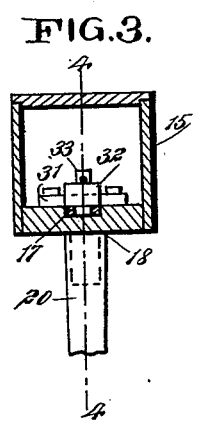
Figure 4:
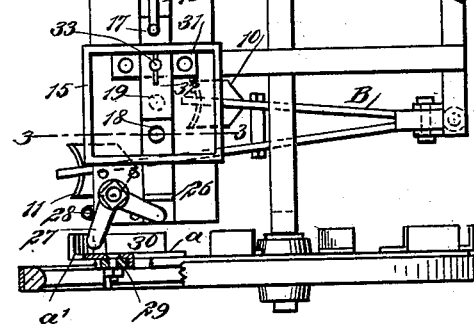
Figure 4:
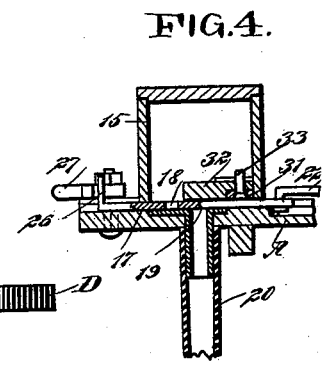
Figure 2:
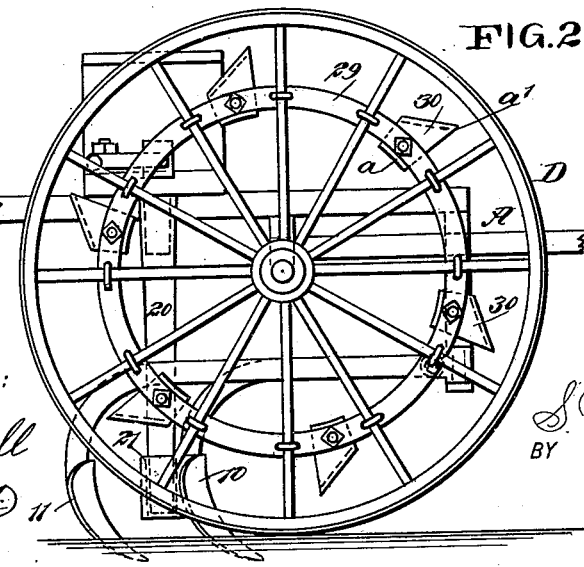

Figure 1 is a plan view of the improved device applied to a cultivator, a portion of the right-hand wheel of said cultivator being broken away. Fig. 2 is a view of the right-hand side of the cultivator with the planting mechanism applied. Fig. 3 is a transverse vertical section taken substantially on the line 3 3 of Fig. 1, and Fig. 4 is a longitudinal vertical section taken practically on the line 4 4 of Fig. 3.

A represents the frame of a cultivator, and B the plow-beams of said cultivator, which beams are in reverse order to the usual arrangement, the forward plow or shovel 10 being at the inside and the rear plow or shovel 11 at the outside portion of the cultivator, the forward plows or shovels 10 serving as furrow-openers and the rear plows or shovels 11 as coverers. The improved attachment may be applied to any cultivator by simply reversing the plow-beams from the ordinary arrangement.

The body of the planting attachment consists of a board or plate C, adapted to extend beyond the sides of the cultivator-frame A, the said body board or plate being secured by one or more bolts 12 to the center braces 13, which likewise serve to support the seat 14. A seedbox 15 is supported on the body C at or near each of its ends, and in the upper face of the body C of the attachment a longitudinal groove or channel 16 is produced at each side of the center, and these grooves or channels extend beneath the seedboxes to the extremities of the body. Each channel or groove 16 receives a drop-slide 17, provided with an opening 18 for the reception of seed, and said openings 18 in the slides are adapted to be brought over outlet-openings 19, made in the body C at about the central portions of the seedboxes, since the body serves as a bottom for said boxes, as shown in Fig. 4. When the openings 18 in the slide register with the openings 19 at the bottom of the seedboxes, the seed carried by the slides will drop through the openings 19 in the boxes into chutes 20, which extend downward toward the ground, and each chute terminates in a shoe 21, preferably attached to the rear portion of the furrow-opening shovels 10, as shown in Fig. 2.

The slides 17 are connected by a bar 22, which bar is passed through guides 23, located upon the upper face of the body C, as shown in Fig. 1, and the slides 17 are held so that their openings 18 will be out of registry with the outlet-openings of the seedboxes, this result being accomplished through the medium of a spring 24, which is coiled around the connecting-rod 22, having bearing against the left-hand guide 23 and against a nut or collar 25, located on the said connecting-rod, as is also shown in Fig. 1. The drop-slide 17 at the right terminates at its outer end, which is outside of the right-hand seedbox 15, in an upwardly-extending flange 26, and this flange is constantly engaged by one member of an angle-lever 27, suitably pivoted at the right-hand end of the body C, as shown in Fig. 1, and the rearward movement of the lever 27 is limited by a proper stop 28. (Shown in Fig. 1.)

The right-hand or ground wheel D of the cultivator is provided with a band 29, concentric with the hub and engaging with the inner faces of the spokes, said band being bolted or otherwise secured to said spokes, as shown in Fig. 2. A series of operating-plates 30 is attached to the inner face of the band 29 by means of bolts or their equivalents, and each operating-plate consists of a member *a*, that is secured to the band 29, and an inwardly-extending member $a'$, the latter member being inclined and the inclination being such that as the machine advances the longer edges of the ascending operating-plates will face to the front. The inclined members $a'$ of the operating-plates 30 are adapted to engage with the member of the angle-lever 27 that is out of engagement with the right-hand seed-drop slide 17, as shown in Fig. 1, and as the machine advances the plates will one after the other operate the angle-lever in such manner as to press the connected seed-drop slide inward and cause the openings 18 and 19 to register and the seed to drop, also compressing the spring 24. As the lever 27 is released from engagement with a plate 30 the spring 24 returns the lever and slides to their normal position.

In order that only the amount of seed contained in the openings 18 of the drop-slides shall be delivered to the chutes or spouts 20, a wiper or cut-off 32 is provided, preferably made of leather, and which rests upon the upper face of each drop-slide over the outlets of the seedboxes, as shown best in Fig. 4. These wipers or cut-offs are attached to cross-bars 31, that are placed transversely in the seedboxes, being secured to the body plate or board C, and a bolt 33 has its head portion countersunk in each cross-bar 31. A pin or nut carried by each of said bolts engages with the upper face of each wiper.

The distance between the hills will be regulated by the distance between the plates 30, and the said plates are adapted to be adjustably placed on the band 29, so that they may be many or but few in number, according to the distance required between hills.

Having thus described my invention, I claim as new and desire to secure by Letters Patent—

A planting attachment for cultivators, consisting of a board or plate adapted to be secured to a cultivator-frame and having a groove or channel produced in each end, and an outlet-opening leading from the bottom of each groove through the plate or board, a chute secured to the under side of the board or plate, a seedbox on each end of the plate or board over the grooves thereof, the said plate or board forming the bottom of the end boxes, apertured seed-slides in the grooves of the board or plate, one of the said slides being provided with a flange at its outer end, a rod connecting the said slides and working in guides on the board or plate, a spring coiled on the rod between one of the guides and a stop on the rod, a bell-crank lever pivoted on one end of the board or plate and having one member engaging the flange of the said slide, and a band adapted to be secured to the inner face of one of the ground-wheels of the cultivator, and provided with a series of operating-plates projecting outwardly and inwardly therefrom, the inwardly-projecting members of the plates being inclined so as to engage the member of the bell-crank lever which is out of engagement with the seed-slide, substantially as described.

SAMUEL W. NELSON.

Witnesses:
THOS. A. BEDFORD,
GEORGE N. LANDRUM.